June 18, 1963 G. W. SMITH 3,093,927
POWER DRIVEN MINIATURE AIRCRAFT
Filed Nov. 23, 1959 3 Sheets-Sheet 1

INVENTOR.
GENE W. SMITH
BY
ATTORNEY

June 18, 1963          G. W. SMITH          3,093,927

POWER DRIVEN MINIATURE AIRCRAFT

Filed Nov. 23, 1959          3 Sheets-Sheet 2

INVENTOR.
GENE W. SMITH
BY
ATTORNEY

June 18, 1963 G. W. SMITH 3,093,927
POWER DRIVEN MINIATURE AIRCRAFT
Filed Nov. 23, 1959 3 Sheets-Sheet 3
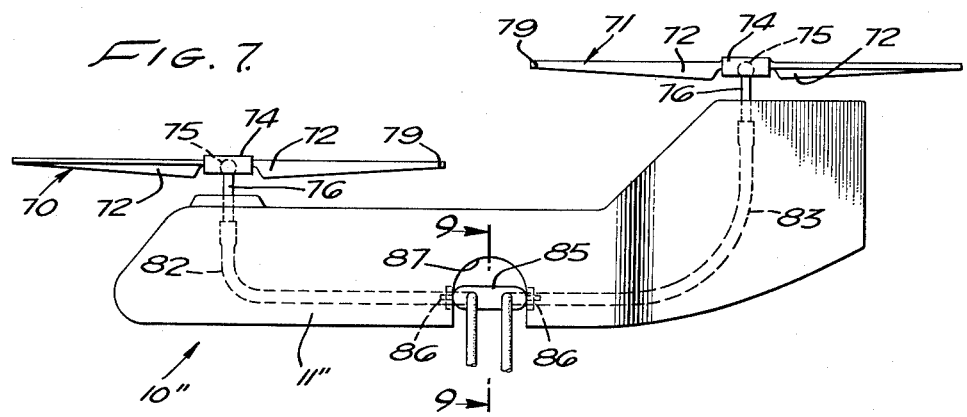
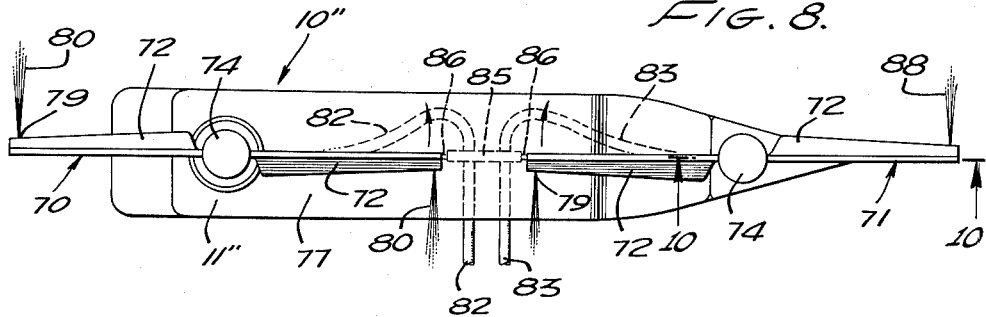
INVENTOR.
GENE W. SMITH
BY
ATTORNEY

United States Patent Office 3,093,927
Patented June 18, 1963

3,093,927
POWER DRIVEN MINIATURE AIRCRAFT
Gene W. Smith, 5008 La Canada Blvd., La Canada, Calif.
Filed Nov. 23, 1959, Ser. No. 854,849
19 Claims. (Cl. 46—77)

This invention relates to miniature or toy aircraft and more particularly to a power-propelled toy aircraft capable of continuous air-sustained flight from energy derived from pressurized fluids supplied to reaction motor means mounted on the aircraft from a source thereof located on the ground and conducted to the aircraft through flexible tubing.

Miniature aircraft of a wide variety of designs and constructions have been proposed heretofore employing self-contained power means capable of sustaining the craft in flight. One such construction employs stored resilient energy releasable over a period of time to rotate a propeller or the like means for propulsion of the craft. The rubber bands, coil springs, etc., utilized as the energy storing means have very limited energy storing capabilities. A more satisfactory type of power plant developed in recent years comprises an internal combustion engine having a crankshaft connected directly to a propeller. Control of the aileron or other flight sensitive surfaces of engine-powered craft through remote control by an operator on the ground is effected in various ways and commonly by a pair of parallel control wires extending between the craft and a connecting link manipulatable by the operator. Many different designs of engine driven miniature aircraft have been proposed and flown.

Nevertheless, all are subject to numerous disadvantages sought to be avoided by the present invention. The resilient spring type of power plant is subject to so many shortcomings owing to its limited power output and particularly its short flight span, that craft depending on spring motors hold the operator's interest but briefly. Internal combustion engine driven aircraft can be flown for extended periods at a wide range of speeds and can be maneuvered through both simple and complex flight patterns rather successfully. However, the cost of the aircraft, the power plant, and the required auxiliary equipment is so high as to be beyond the resources of many youngsters. The technical know-how required to operate these devices and the very substantial hazards unavoidably involved limit the use of such craft to the hands of cautious and skilled operators and normally require the presence of an adult. A particularly serious disadvantage is the high operating noise level of the engine. In fact, this obstacle is so serious that many populated communities prohibit the flight of such craft altogether or restrict flights to designated areas and times. A further disadvantage of previously proposed powered aircraft is that they are dependent on propellers for propulsion whereas modern flight technology relies heavily on jet propulsion.

In view of the growing emphasis on jet engines for aircraft power plants, feeble attempts have been made to propel toy aircraft using a simple reaction motor, but with small success. For example, it has been proposed to use the body of the airframe to contain pressurized air exhausting rearwardly through a nozzle and effective to propel the craft for the brief interval required to consume the limited air supply. To avoid these short duration flight capabilities it has been proposed to suspend the aircraft from a flexible tube through which air under pressure is supplied to drive a propeller by the aid of an impulse turbine.

In the light of the many shortcomings and serious limitations of prior power driven aircraft of the miniature or toy type, it is the purpose of the present invention to provide an air-sustained aircraft powered by one or more reaction type motors and capable of continuous free flight within the vicinity of an operator. Aircraft of the widest variety of designs, types and constructions can be flown utilizing the principles of the present invention including fixed and movable airfoil types as well as many others. Not only is the aircraft of this invention substantially noiseless in flight but it is capable of being flown without substantial hazard to property or the person by children of wide age range, and the substantially endless design and operating possibilities are so great as to interest and provide a continuing challenge to both children and adults. Although pressurized gas or liquid can be employed as the continuous energy source, a particularly inexpensive and universally-available supply is provided by the pressurized water supply commonly available in most buildings and dwellings. This or other pressurized fluid is conducted to the aircraft through flexible lightweight tubing of any suitable length and is utilized to energize a simple reaction motor on the plane. In a typical form, such a motor may comprise a discharge nozzle located in the end of a supply tube and either fixedly or movably mounted on the craft. The nozzle may be used singly or in multiple, and may be shifted to change the flight path under control from the ground at the operator's election to maneuver the plane through an intricate flight path. If desired, the reaction motor may be mounted in the tips of helicopter-type rotating airfoils to the end that the helicopter may be flown by jet-propelled airfoils. Maneuvering of the helicopter is achieved as by controlling the relative speeds of rotation of the airfoils and in other ways consistent with the principles of this invention.

Control of types of aircraft employing this invention is achieved without undue complexity and by means which will be disclosed herein. The speed of flight and maneuver of the craft may be provided in numerous ways including the control of the rate of fluid flow, control of fluid pressure, and movement of plane components through forces delivered selectively through parallel multiple tubes or control links extending between the craft and the ground-based operating station.

Another feature of the invention is the provision at the ground station of a hand-held control member to which the pressurized fluid supply hose is connected. This control member includes finger operated members actuatable by the fingers of one hand to effect all necessary movements required for the maneuver of the craft, including its take-off and landing.

Accordingly, it is a primary object of the invention to provide a toy or miniature airplane adapted to be flown in free flight in the vicinity of a ground control station and utilizing energy continuously supplied to the plane from the ground station.

Another object of the invention is the provision of a miniature aircraft designed to be flown and maneuvered at the will of the ground-stationed operator utilizing pressurized fluid to provide the propelling energy.

Another object of the invention is the provision of an inexpensive miniature aircraft powered by a reaction type motor and having common connections with a ground-stationed operator for supplying energizing fluid to the craft and for controlling its flight pattern at the will of the operator.

Another object of the invention is the provision of a toy aircraft having a plurality of reaction type propulsion motors continuously supplied with pressurized fluid from a source on the ground and embodying control means so simple and so easily manipulated as to be readily mastered by children and yet which are sufficiently versatile as to challenge and hold the interest of older children and adults alike.

Another object of the invention is the provision of a self-powered miniature aircraft having a plurality of reaction motors independently supplied with pressurized fluid and controllable by an operator on the ground to maneuver the craft at will including take-off and landing of the craft under power.

Another object of the invention is the provision of the reaction type propulsion and flight control system for miniature aircraft so designed as to be readily installable on existing craft thereby to convert non-power driven miniature craft to powered flight operation.

Another object of the invention is the provision of a reaction type propulsion system for aircraft adapted to fly heavier-than-air craft of all known types, including fixed and moving wing types.

These and other more specific objects will appear upon reading the following specification and claims and upon considering in connection therewith the attached drawings to which they relate.

Referring now to the drawings in which preferred embodiments of the invention are illustrated:

FIGURE 7 is a side elevational view of a helicopter type aircraft employing principles of this invention;

FIGURE 8 is a top plan view of FIGURE 7;

FIGURE 9 is a fragmentary sectional view on an enlarged scale taken along line 9—9 on FIGURE 7; and FIGURE 10 is an enlarged fragmentary sectional view taken along line 10—10 on FIGURE 8.

Figure 1:
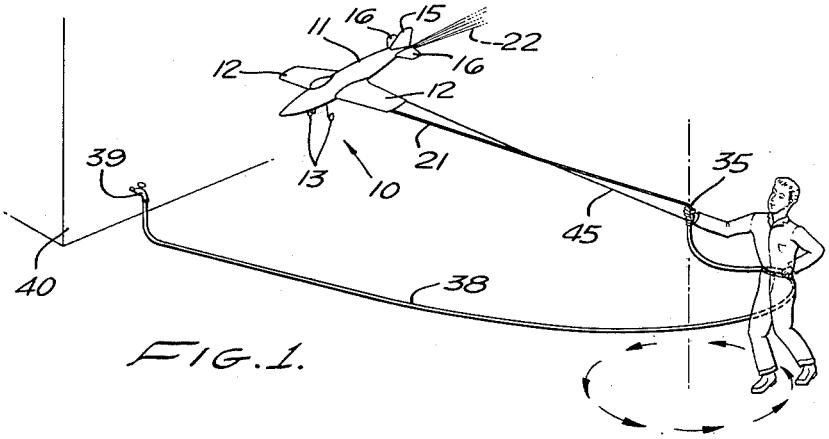
FIGURE 1 is a view showing one preferred embodiment of the invention in flight.
Figure 3A:
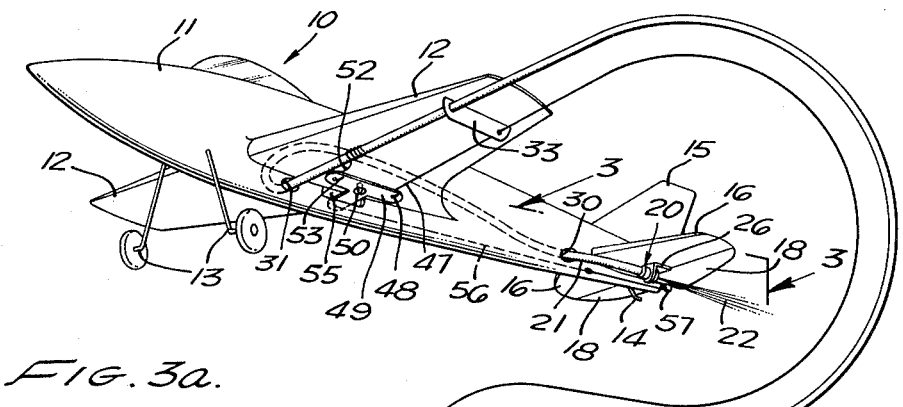
FIGURE 3a is a view similar to FIGURE 3 but showing an alternate mode of controlling the flight path of the aircraft.
Figure 3:
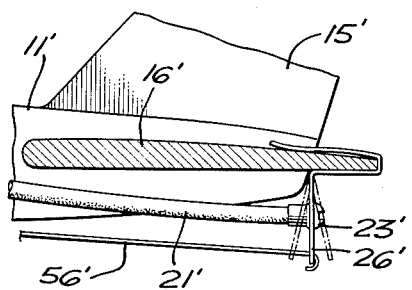
FIGURE 3 is an enlarged fragmentary sectional view adjacent the reaction motor of the FIGURE 1 embodiment and showing the relationship of this motor to a control aileron.
Figure 3:
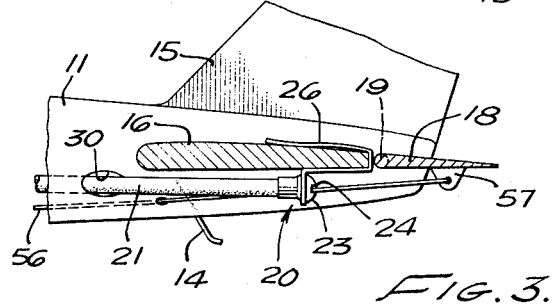
Figure 2:
FIGURE 2 is an enlarged perspective view of the FIGURE 1 embodiment as it appears to the ground-stationed operator in flight.

Referring first to FIGURES 1 to 3, there is shown one preferred embodiment of the invention comprising a miniature aircraft designated generally 10 having an aerodynamically contoured airframe including an elongated tear-shaped fuselage 11 having fixed to its opposite sides wings or airfoils 12, 12. To facilitate landing and take-off the forward end of fuselage 11 is provided with a suitable wheeled carriage 13 while the rear may be supported suitably as by rearwardly projecting skid 14. The tail structure includes the usual vertical fin 15 and oppositely projecting horizontal fins 16, the latter preferably each including an aileron 18 pivoted to fuselage 11 at 19 in any suitable manner for concurrent movement. In normal level flight it will be understood ailerons 18 lie in the same general plane as and form extensions of tail fins 16, 16. Upward or downward pivotal movement of ailerons 18 about the aligned horizontal axis of pivot 19 is effective in known manner to cause the nose of the plane to rise or dive depending upon the direction of movement of the ailerons from their normal level flight position.

The flight control and power system for aircraft 10 comprises a reaction motor 20 attached to the discharge end of a small-bore, lightweight, flexible, plastic tube 21. In its simplest form, motor 20 comprises simply a fitting having a small bore axial orifice for jetting the pressurized fluid supplied thereto rearwardly of the aircraft in a fine high velocity jet 22. As here shown, the semi-spherical rear end 23 of the motor is slotted transversely as is indicated at 24 and the small bore orifice opens through the bottom portion of this slot. It is pointed out that slot 24 is not essential to the operation of the motor and may be omitted if desired without detrimental effect, the purpose of slot 24 being to facilitate assembly of the motor, the constructional details of which are not essential to an understanding of this invention as herein broadly claimed. Secured to the midportion of motor 20 is a U-shaped mounting clip 26 of suitable resilient strip material of metal, plastic or the like. Mounting clip 26 is so contoured and proportioned as to have a snug frictional fit over the rear edge of one of the tail fins 16 thereby avoiding the need for assembly fasteners. Desirably, clip 26 is press-assembled over the rear edge of one of the tail fins 16 and shifted as necessary into its desired operating position closely adjacent fuselage 11 with the axis of the jet orifice close and parallel to the longitudinal axis of the craft.

Tube 21 for supplying the pressurized fluid may be secured along the body of craft 10 in any suitable manner without need for fasteners, as by threading the tube through elongated openings 30, 31 in the fuselage and then along one wing. Additional support in the form of a flange 33 mounted near the tip of one wing constitutes the only other necessary connection of the tube with respect to aircraft 10.

It will be understood that the lightweight flexible tube 21 is of sufficient length to reach to a remote manned operating station, a distance varying widely depending on the size of the aircraft, its power requirements, the pressure and type of fluid used to power the motor, the available maneuver space, and the like factors. As will be appreciated, the load lifting capabilities of the airframe are an important factor since the weight and drag of the fluid supply tube limit the length of the tube and of the flying radius. A typical small model aircraft may be flown and readily maneuvered using a tube of 15, 40, 50 or more feet in length. It will be understood that these tube lengths are mentioned by way of example of tube lengths found highly satisfactory in flying a wide range of conventional small model planes using water supplied from municipal water supplies as the energy source.

Water from municipal water supplies is highly effective and practical but it is to be understood that other sources of pressurized fluid may be used including both gases and liquids, the principal deciding factors usually being those of cost and availability.

The ground station or control end of tube 21 makes use of a hollow handgrip 35 molded or cast from suitable material and having a freely rotatable threaded nipple 36 at its lower end to which the threaded sleeve 37 of a garden hose coupling may be readily secured. Any suitable flexible garden hose 38 serves to connect handgrip 35 to a source of pressurized fluid, such as the service spigot 39 usually found on the outer wall of a dwelling indicated at 40. Preferably, the pressure and volume of the water permitted to flow from hose 38 through handgrip 35 and into tube 21 is controlled by suitable regulating means housed within handgrip 35 and controlled by a movably supported trigger or button 42 projecting from one edge of handgrip 35. It will be understood that normally the fluid supply from the handgrip to tube 21 is automatically closed by suitable means such as a spring biased valve readily adjusted to any desired degree of opening by pressing button 42 inwardly.

Supplementing and cooperating with tube 21 and handgrip 35 in controlling the flight of the aircraft there is provided a thin lightweight non-stretching tension link 45 having its lower end anchored to handgrip 35 as by pin 46. Tension link 45 may comprise a nylon cord, a very slender high strength wire, or the like having substantially the same length between the plane and grip 35 as the corresponding portion of tube 21. End 47 of link 45 is connected at 48 to a T-shaped rigid bellcrank member 49 pivoted to the underside of wing 12 close to the fuselage, as by headed pin 50. The opposite end of the head portion of member 49 is adjustably connected to tube 21 in any suitable manner as by a length of piano wire 52 having one end hooked to member 49 as is indicated at 53 and its coiled end snugly embracing tube 21 with sufficient pressure to retain any selected adjusted position therealong while being forcibly shiftable to a different position if so desired. The coiled portion of link 52 may be cemented to the tube although this is not found necessary and is desirably omitted since the snug frictional fit permits of adjustment along the tube as is sometimes necessary for the most effective use of link 52 in controlling the operation of the plane. The stem portion of member 49 extends through an elongated opening 55 in the fuselage and has a relatively rigid and non-bending connecting link 56 extending therefrom through an opening in the fuselage to a tab 57 secured to the underside of aileron 18.

From the foregoing it will be readily understood that if link 45 is of substantially the same length as the corresponding portion of tube 21, the tensioning of either link 45 or tube 21 while relaxing the tension on the other of these members will result in the pivotal movement of member 49 and of ailerons 18 about the latter's pivot 19. As will be evident from the foregoing, tube 21 serves important dual functions, namely, the supply of pressurized fluid to motor 20 as well as one of a pair of tension links through which control forces are transmitted between the operator and control means on the aircraft.

To fly craft 10, it is merely necessary to connect a source of pressurized fluid to the rotatable nipple 36 carried by handgrip 35. Standing to one side of plane 10 a distance approximating the length of control links 21 and 45, the operator grasps handgrip 35 in his right hand using the index finger to depress valve control button 42 and supply water under pressure to motor 20 by way of tube 21. The static energy of the fluid supplied to motor 20 is converted to kinetic energy as the water flows through the rearwardly facing orifice of the motor and issues therefrom as a high velocity jet 22 which is effective to propel the craft forward on its carriage 13 and skid 14. As the craft reaches flying speed it lifts into the air. Owing to the tethering action of tube 21 and link 45, the craft flies in a circle about an axis passing through the handgrip as the operator steps backward in a circle indicated in broken line in FIGURE 1. So long as handgrip 35 is held in a manner to maintain ailerons 18 in the plane of tail fins 16, the craft travels in level flight. Inclination of handgrip 35 relative to its longitudinal axis in a manner to unbalance the tension forces acting along links 21, 45, elevates or depresses ailerons 18 causing the plane to rise or dip depending upon the direction of movement of the handgrip.

Change of speed is easily and simultaneously effected if desired by varying the position of the control button 42. Flight patterns of complex and endlessly variegated pattern may be flown by appropriate manipulation of handgrip 35 in accordance with the foregoing and flight control techniques well known to those experienced in the control of powered toy aircraft. Landing of the craft from a period of flight is initiated by decreasing the flow of pressurized fluid to motor 20 thereby allowing the plane to slow down and glide to a landing.

In a slight modification of the control means illustrated in FIGURE 3a, the spring clip mounting 26' for jet motor 23' is pressed over the rear edge of stationary tail fin 16', and control link 56' is attached to the lower end of an extension on clip 26'. Normally, this extension occupies the dotted line position inclined toward the right wherein the jet stream issuing from motor 23' is inclined upwardly causing the nose of the plane to rise. In the full line position of motor 23', the axis of the jet is parallel to the axis of the craft, and the latter flies in a level position. If control link 56' is pulled harder, a clip 26' is flexed to the left causing the plane to nose downwardly. It will therefore be appreciated that the flight path is readily controlled merely by shifting the axis of the jet motor relative to some other part of the craft such as the longitudinal axis of the craft.

Figure 4:
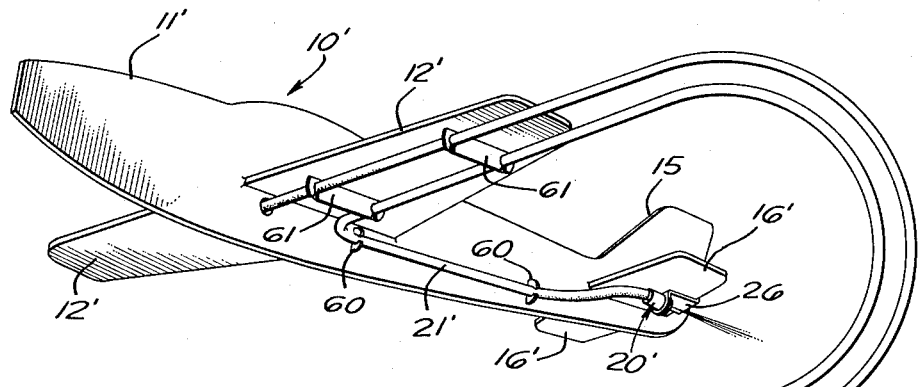
FIGURE 4 is a perspective view similar to FIGURE 2 of a second embodiment of the invention propelled by a pair of motors.
Figure 5:
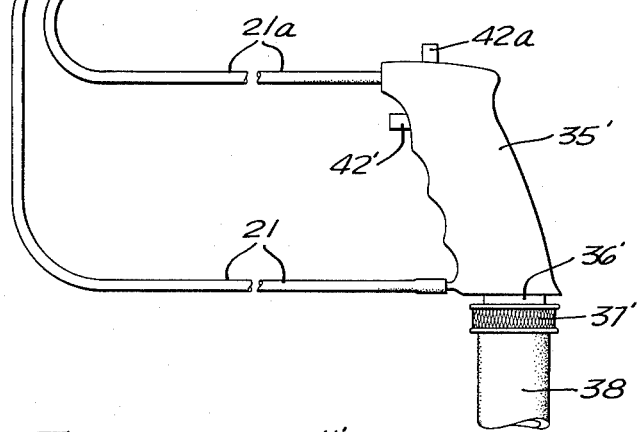
FIGURE 5 is an enlarged fragmentary perspective view of the tail assembly of FIGURE 4 showing a typical one of various dispositions of the reaction motors relative to the tail structure.
Figure 6:
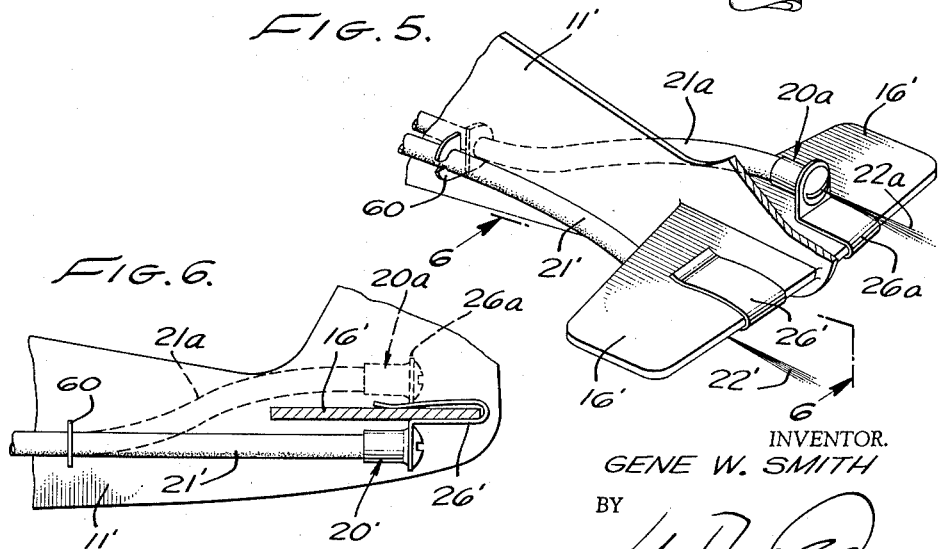
FIGURE 6 is a fragmentary enlarged sectional view taken along line 6—6 on FIGURE 5.

A second preferred embodiment illustrated in FIGURES 4 to 6 is generally similar to that just described, it being understood that the same or similar parts to those present in FIGURES 1 to 4 are identified by the same reference characters distinguished by the addition of a prime. As will be recognized from the drawings, the airframe including fuselage 11' and fixed wings 12' is of very simple construction, these being formed from lightweight sheet material secured together in any suitable manner. Another principal difference resides in the fact that the plane is propelled by a pair of identical reaction motors 20' and 20a symmetrically secured one to each of the horizontal tail fins 16' in the non-symmetrical manner best illustrated in FIGURE 5. For example, motor 20a is clipped by a friction spring clip 26a to the upper surface of tail fin 16', whereas motor 20' is clipped by a similar mounting clip 26' to the underside of the other tail fin 16'. Note that the axis of each motor is approximately the same distance from the longitudinal center line of the fuselage.

It is pointed out and emphasized that motors 20' and 20a may be mounted on the plane in a great variety of arrangements, each having a different effect on the flight of the craft. For example, both motors may be mounted on the upper surfaces of the tail fin, or both on the lower surfaces, or in the alternate position to that illustrated in FIGURE 5. Different locations of the motors will impart different flight characteristics of the plane in flight. It will also be recognized that the axes of the two motors can be spaced unequally from the vertical tail fin if desired to produce a still different effect on the flight path taken by the plane.

The plastic tubes 21', 21a supplying pressurized fluid to the respective motors may be secured in place along the fuselage and wings of the plane in any suitable manner, as by the clips indicated at 60 and 61. As here shown, lower ends of tubes 21', 21a are connected to the opposite ends of hollow handgrip 35'. It will be understood that handgrip 35' includes independent controls for regulating the pressure and flow rate of the fluid passing to tubes 21', 21a, spring pressed control button 42' controlling the flow of fluid to tube 21' and a similar thumb pressed control button 42a located at the top of the handgrip being similarly effective to control the flow of fluid to tube 21a.

The construction shown in FIGURES 4 to 6 is flown in a manner closely related to that described above in connection with the first embodiment. However, handgrip 35' is not effective to control the flight path by mere tilting; instead, climb and diving movements of the plane are controlled by the differential regulation of buttons 42' and 42a, it being noted from FIGURES 5 and 6 that, owing to the disposition of motors 20' and 20a above and below the longitudinal axis of the craft, the craft has a greater impetus either up or down depending upon which motor receives the greater quantity of fluid or fluid at the higher pressure. Accordingly, the operator has but to press one button more than the other to cause the plane to rise or to dive, the rate of change in elevation being related to the mentioned differential adjustment of buttons 42' and 42a.

Referring now to FIGURES 7 to 10, there is shown a third embodiment designated generally 10" and readily recognized as being a twin rotor helicopter having an elongated fuselage 11" rotatably supporting at its opposite ends and in generally horizontal planes a pair of rotating airfoils 70, 71. As herein shown, airfoils 70, 71 are of identical construction and are provided with diametrically disposed aerodynamically contoured blades 72 having fluid flow passages 73 extending to the tips thereof. Passages 73 open into a hollow hub 74 having a ball and socket fluid-tight joint with a ball 75 formed at the upper end of a tube 76. This tube is fixed to the top surface of top wall 77 of the hollow fuselage 11".

Ball 75 has fluid discharge passages 78 opening into hub 74 and distributing passages 73 in blades 72. Opening laterally through the trailing edge of each blade tip is an orifice 79 which constitutes the outlet port of the reaction motors formed in the tips of airfoils 70, 71 and serving to propel the same in opposite directions about bearing ball 75.

The means for supplying pressurized fluid to the lower ends of tubes 76 comprises plastic tubes 82, 83 of generally similar length and extending to the ground control station and connected to a source of pressurized fluid through a control device as device 35′ illustrated in FIGURE 4. Tubes 82, 83 have a pivoting support midway between airfoils 70, 71 formed by a rigid member 85 having trunnions 86 projecting from its opposite ends and journaled in the opposite sides of a doorway 87 formed centrally in one side wall of fuselage 11″ in the manner best illustrated in FIGURES 7 and 9. Each of the tubes 82, 83 passes through an opening formed near the opposite ends of member 85, it being understood that each of the tubes has a snug friction fit with the opening in member 85. If desired, suitable clamp means or adhesive may be employed to prevent movement of the tubes axially of the supporting openings therefor in member 85. Desirably, each of the tubes has an identical length between the outer side of member 85 and the point of connection with the opposite ends of handgrip 35′.

During initial take-off, the fuselage of helicopter 10″ may be held horizontally in the hand as the other hand grasps handgrip 35′ and depresses buttons 42′, 42a to admit pressurized fluid through tubes 82, 83 to the reaction motors located in the tips of rotors 70, 71. If adequate and substantially equal quantities of fluid are admitted to each rotor, the rotors will lift the craft vertically to a desired height. Thereafter, movement in a desired direction may be initiated by admitting a greater quantity of the fluid to one of the rotors thereby operating it at a higher speed than the other. This differential operation of the rotors will cause the fuselage to tip and to move in a desired direction in accordance with well known operating principles applicable to helicopters. Movement in the opposite direction is accomplished by decreasing the flow to one rotor and increasing the flow to the other, it being apparent that the rate of travel in a desired direction is governed by the differential rates of rotation and by the differential supply of fluid to the reaction motors associated with each airfoil.

Although the embodiments hereinabove disclosed are illustrative of the principles of the invention, it is pointed out and emphasized that these principles can be incorporated in remote controlled unmanned miniature vehicles generally including land, water and air craft. For this reason it is to be understood that the presence of the term aircraft in the annexed claims is not used as a word of limitation unless a claim includes other limitations properly limiting the defined structure to one suitable for air-sustained flight.

While the particular power driven miniature aircraft herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A reaction powered miniature aircraft capable of continuous free flight within a limited air space under the guidance of a remotely stationed operator, said aircraft having an airframe, reaction motor means free of internal moving parts operatively associated with said airframe effective to launch said airframe and to sustain the same in atmospheric air so long as supplied with pressurized fluid, and means for controlling the flight path of said aircraft at the will of the operator including small bore tube means for conducting a controlled supply of pressurized fluid to said reaction motor means from a source thereof on the ground, said flight path control means including means for shifting the axis of said reaction motor means relative to the aircraft itself from the operating station and while the aircraft is in flight thereby to vary the flight path and flight characteristics of said aircraft.

2. An unmanned free flying aircraft adapted to be flown through the air in an operator-selected continually changing flight pattern within a restricted air space in the vicinity of the operator, said aircraft having a generally rigid airframe including reaction motor means movably supported on said air frame having a jet orifice positioned to direct the fluid passing therethrough to the atmosphere exteriorly of the aircraft and directed oppositely to the direction of flight and operable when energized by fluid pressure to lift the air frame into the atmosphere and to propel the same in air-sustained flight solely by the pressurized fluid jetting into the atmosphere from said orifice opening with the aircraft flying through the air along a path selected by the operator, and lightweight small bore flexible tube means supported by said airframe with one end discharging into and energizing said reaction motor means and its other end being adapted to be connected to a source of pressurized fluid, and means extending between the operator and said movably supported reaction motor means manipulatable by the operator to change the flight path of the aircraft in accordance with the operator's wishes.

3. An aircraft as defined in claim 2 characterized in that said pressurized fluid is a liquid and in that said reaction motor means includes nozzles for jetting said liquid into the atmosphere in a manner to convert static pressure energy into kinetic energy to sustain said aircraft in the air.

4. An aircraft as defined in claim 3 characterized in that said operator manipulated means for changing the flight pattern of said aircraft includes control means for varying conditions of the pressurized fluid supplied to said reaction motor means on said aircraft.

5. An aircraft as defined in claim 3 characterized in that said aircraft is provided with a plurality of said reaction motor means each having means for receiving pressurized energizing fluid from said flexible tube means.

6. An aircraft as defined in claim 5 characterized in that said operator manipulated means for changing the flight pattern includes means for controlling the operation of at least one of said reaction motor means in a manner to vary the flight pattern of said aircraft.

7. An aircraft as defined in claim 5 characterized in that said flexible tube means includes an independent fluid flow channel from the source of pressurized fluid to each of said reaction motor means, and operator controlled means for selectively varying pressurized fluid conditions for at least one of said motor means to vary the flight of said aircraft.

8. An aircraft as defined in claim 7 characterized in the provision of independently operable control means for the pressurized fluid flowing to each of said reaction motor means.

9. A jet engine propelled aircraft adapted to be flown through the air out-of-doors through operator-controlled intricate air-sustained flight patterns, said aircraft comprising a main body provided with a plurality of wide area flight-sustaining members projecting laterally therefrom, jet engine means for propelling said aircraft by the reaction of pressurized fluid discharging into the ambient air exteriorly of the aircraft, said engine having friction clip mounting means secured thereto and engageable about an edge of said aircraft for holding said engine assembled thereto firmly in any of a wide range of operating positions, a flexible hose many yards in length extending from said engine to the ground-based operator of said aircraft, means for connecting said flexible hose to a source of pressurized fluid, and means extending between said aircraft and the operator and cooperable with said flexible hose under control forces applied by the operator to vary the flight path of the aircraft as desired by the operator.

10. A jet engine propelled aircraft as defined in claim 9 characterized in that said engine mounting means comprises spring clip means having a friction fit over the edge of one of said flight-sustaining members and retained firmly in a selected position therealong by friction.

11. A jet engine propelled aircraft as defined in claim 10 characterized in that said engine mounting means includes a resilient tab projecting therefrom and supporting said engine spaced away from the clip portion of said mounting means, and flexible tension line means between said resilient tab and the operator on the ground and effective to flex said tab to vary the longitudinal axis of said jet engine with respect to the flight path to shift the path of flight of said aircraft.

12. A jet engine propelled aircraft adapted to be flown in air-sustained flight out-of-doors at the end of a pair of long flexible lines held in the hand of the operator and maintained under tension while in flight by centrifugal forces, said aircraft having wing and tail members projecting laterally from the main body thereof, a jet engine without moving parts operable to propel said aircraft by the reaction of pressurized fluid discharging axially thereof into the air exteriorly of said aircraft, said jet engine being movably mounted on one of said tail members and offset from the longitudinal axis of said aircraft, said jet engine being shiftable with respect to said tail members as desired to vary the flight path and characteristics of said aircraft, and including means for holding the said jet engine firmly in any desired adjusted position.

13. A jet powered toy aircraft adapted to be flown in air-sustained flight and maneuvered from control means held in the hand of a ground-stationed operator, said aircraft comprising an airframe, jet engine means mounted on said airframe having an orifice opening and effective to propel the same in air-sustained flight by the reaction of a pressurized stream of fluid discharging from said jet engine means into the surrounding air, control means for said aircraft comprising a pair of flexible parallel lines extending from said airframe to a handgrip member adapted to be carried entirely in and manipulated by one hand of the operator, one of said lines being a flexible lightweight tube transmitting pressurized fluid to said jet engine means and both of said flexible lines being operatively connected to flight direction control means on said airframe and effective by the relative longitudinal displacement of said flexible lines to vary the flight path of said aircraft by the manipulative movement of said hand-held control member.

14. A jet powered aircraft adapted to be flown through the air in free flight from pressurized water derived from a municipal water supply system or the like, said aircraft having an airframe provided with water-powered jet engine means having an orifice discharging into the air exteriorly of said aircraft in a direction to propel said airframe by the reaction forces of said water jet on said airframe, a movable member carried by said airframe effective to change the direction of flight as it is shifted from one position to another on said airframe, a hand-held substantially palm-size control member adapted to be carried in one hand of an operator and having a flexible water-conveying connection with said source of pressurized water, and a pair of spaced-apart flexible lines extending from said control member to said airframe, one of said lines being a lightweight flexible tube conveying water to said water-powered jet engine means and both lines being longitudinally movable relative to one another under the control of an operator on the ground and effective to transmit tension forces of varying magnitude to said movable member as desired and as necessary to control the flight path of said aircraft.

15. A jet propelled toy aircraft adapted to be flown through the air in free flight by pressurized liquid supplied to the aircraft through a flexible hose forming part of a hand-held manipulative control grasped by an operator, said aircraft having a jet engine comprising a nozzle secured to the rear end thereof and discharging into the exterior air in a direction to propel said aircraft forwardly at a velocity to sustain said aircraft in free flight, flight direction control means movably supported on said aircraft, said control for said aircraft comprising a handgrip sufficiently light in weight to be held in the operator's hand and having means for connecting the same to a source of pressurized liquid, a lightweight flexible hose extending between said handgrip and the jet engine on said aircraft, and a flexible line in tension extending from said handgrip to said flight direction control means on said aircraft and manipulatable through longitudinal displacement thereof to control the flight path of said aircraft.

16. A jet propelled toy aircraft as defined in claim 15 characterized in the provision of finger-actuated valve means on said hand-held control adjustable by finger pressure to vary the flow of pressurized liquid delivered to said jet engine to control the speed of said aircraft.

17. A jet propelled aircraft as defined in claim 15 characterized in that said jet engine is secured to said aircraft laterally to one side of the longitudinal axis of said aircraft.

18. A jet propelled aircraft as defined in claim 15 characterized in that said aircraft has wings projecting from the forward portion thereof and a plurality of tail members projecting from the rear portion thereof, said jet engine being secured to one of said tail members and laterally to one side of the longitudinal axis of said aircraft.

19. A jet propelled aircraft as defined in claim 15 characterized in that said jet engine is mounted on said flight direction control means and in that the longitudinal axis of said jet engine is shiftable to different angular positions with respect to said aircraft to change the flight path thereof.

References Cited in the file of this patent

UNITED STATES PATENTS

| | | |
|---|---|---|
| 2,331,187 | Harris | Oct. 5, 1943 |
| 2,484,468 | Schaad | Oct. 11, 1949 |
| 2,676,013 | Walker | Apr. 20, 1954 |
| 2,743,068 | Walker | Apr. 24, 1956 |
| 2,824,408 | Cauley | Feb. 25, 1958 |
| 2,921,743 | Westover et al. | Jan. 19, 1960 |